May 1, 1962 S. H. EVANS 3,032,423
HEAT EXCHANGE PROCESS AND APPARATUS
Filed Feb. 15, 1960 2 Sheets-Sheet 1

INVENTOR
Stewart H. Evans
BY

ATTORNEYS

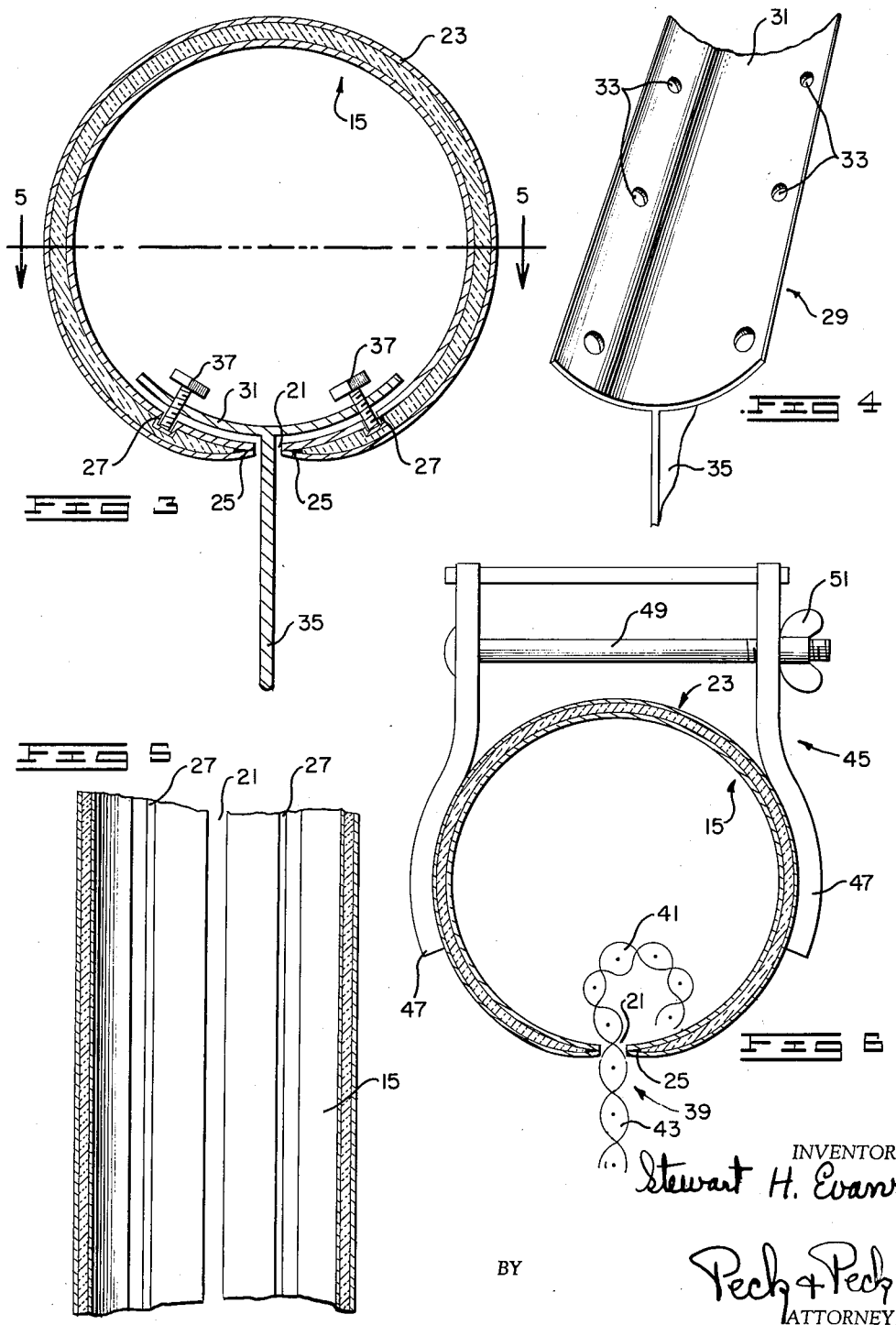

United States Patent Office 3,032,423
Patented May 1, 1962

3,032,423
HEAT EXCHANGE PROCESS AND APPARATUS
Stewart H. Evans, Chester County, Pa., assignor to Evanclan, Washington, D.C., a partnership
Filed Feb. 15, 1960, Ser. No. 8,762
13 Claims. (Cl. 99—215)

This invention relates broadly to the heat exchange arts and in its more specific aspects it relates to a process and apparatus for controlling the distribution and feeding of a fluent material into a pressurized and heat treating zone; and the nature and objects of the invention will be readily recognized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

With the development of successful methods of instantaneous high heat treatment of fluent materials, such for instance as milk, without adversely effecting certain characteristics thereof, a need has arisen for a method and apparatus whereby the milk may be fed in the form of a film into the pressure and heat zone under certain conditions which must be adhered to and maintained.

Experience has indicated that in systems for heat treating fluent materials of the nature of those in which I am particularly interested, wherein the material is fed in the form of a thin film from a distribution system into a pressure vessel for heat treatment, successful treatment requires that the temperature relationship between the distribution system and the pressure vessel must be preserved, differences in pressure between the distribution system and the pressure vessel must be maintained, means must be provided for controlling the volume of flow of the material from the distribution system to the pressure vessel and the film forming surface must be completely and fully covered and insulated by the material being treated.

As far as I am aware, no fluent material feeding means of the prior art, for use in processes of the general character of those with which I am concerned, satisfies the aforementioned and other requirements, and thus known methods and apparatus are not entirely satisfactory.

I have devised a fluent material feeding system which overcomes the deficiencies inherent in prior systems and provides means whereby the aforementioned and other prerequisites are met.

It is therefore a prime objective of my invention to provide a process and apparatus for introducing fluent materials into a pressure vessel in the form of a relatively thin film for heat treatment in such a manner that there will be no adverse effects on the material being treated.

The following examples may help to explain further the nature of the problem involved:

(A) *The Necessity for Differences of Pressure and Temperature Inside a Pressure Vessel*

The general practice is to preheat liquids before injecting them into pressure vessels for high heat treatment. This can shorten the time of high heat treatment. It also lessens the amount of heat which has to be transferred to the liquid while in the pressure chamber.

The temperature achieved by preheating is frequently on the order of 150 degrees F. This figure is almost critical in the case of fluent materials containing high percentages of water. In saline and brackish waters any heating to temperatures above 150 degrees F. tends to intensify precipitation of solids, thus causing encrustation of the walls of pipes or containers which may require time-consuming cleaning operations, or which may interfere with the controlled flow of the liquid through the distribution system.

Temperatures to which liquids may be subjected after they have been discharged into the pressure vessel may vary greatly. All temperatures will be above the boiling point of 212 degrees F. because otherwise there would be no need for pressure vessel containment. The actual temperatures used will be controlled by scientifically established time-temperature relationships. Temperatures of fluent food products such as milk will seldom exceed 300 degrees F. In heat treatment of vegetable oils temperatures on the order of 600 degrees F. may be used. In the mining of sulphur temperatures may be varied in some relationship to the depths at which the sulphur deposits are located.

The pressure maintained in the pressure vessel will be in a fixed relationship to the heats used. Standard tables show this relationship.

(B) *The Necessity for Maintaining Differences of Pressure and Temperature Between the Distribution System Inside the Pressure Vessel and the Pressure Vessel Itself*

When a liquid which has a critical temperature of approximately 150 degrees F. has been preheated to about that temperature, precaution must be taken to prevent any additional heat being imparted to the liquid until it is injected into the pressure vessel proper where the high heat will be applied. This creates a requirement that the distribution system be insulated from the point where it enters the pressure vessel to the point where it discharges the liquid into the vessel.

Pressure within the distribution system must be maintained for two purposes. A pressure pump must be inserted in the distribution system to maintain a pressure somewhat higher than the pressure in the pressure vessel in order to force the fluid under treatment into the chamber of the pressure vessel. There must also be a narrow orifice at the point where the fluid is discharged from the distribution system into the pressure vessel in order to prevent any of the high heat medium in the pressure vessel from entering the distribution system where it might upset established time-temperature relationships and have an adverse effect upon the product.

(C) *The Effect of the Distribution System on the Treatment of the Fluid Within the Pressure Vessel*

There are two important ways in which the distribution system covered by this invention contributes to the effectiveness of the high heat treatment within the pressure vessel.

The first has to do with the formation inside the distribution system of the thin film in which the liquid under treatment will be subjected to high heat treatment. When plates are used as are contemplated in this invention, in order to create a large surface area on which heat treatment can take place, every part of each plate must be covered completely by the film formed by the fluid. Such complete coverage cannot be achieved by trying to form a film within the pressure vessel after the liquid has been discharged from the distribution system. Such a practice leaves at least some portion of the plates exposed directly to the high heat which exists within the pressure chamber. Such exposure permits the plate to acquire some of the heat within the pressure vessel and to create "stick on" which can produce an adverse effect on the product under treatment. By forming the film within the distribution system the entire area of the plates is covered by the fluid under treatment thus forming an insulation against the heat within the chamber and preventing any "stick on" or other heat treatment effect which can be harmful to the product.

The second way in which the distribution system covered by this invention contributes to the effectiveness of the high heat treatment process is by controlling the volume in which the liquid is presented for high heat treatment within the pressure vessel. This is done by controlling the thickness of the film. While the pressure within the distribution system will tend to create a substantially equal film on all the plates within the pressure vessel, two dangerous possibilities exist. One is that the film will be too thin. If that happens, surface tension of the film on the plates is likely to be broken, thus exposing the plates to direct heat and creating the adverse effects already mentioned. The other is the possibility that the film will be too thick. In that case the heat may not penetrate the film deeply enough to affect every particle of the fluid in exactly the same way. Failure to treat each particle exactly the same can destroy the effectiveness of the heat treatment process.

The necessary control over volume can be provided only by a distribution system such as that contemplated in my invention. An adjustable control, while not necessary, should be provided to enable the heat treatment process to be used on liquids of different consistencies.

In developing this process and apparatus whereby controls are provided for flow of the fluent material being treated, and the above discussed conditions are met, I have not sacrificed economy of manufacture and use, ease of adjustment and assembly and practical elimination of maintenance and upkeep costs.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 3 is a vertical sectional view through a feed pipe and its film forming and volume control means.

FIG. 4 is a perspective view with parts thereof broken away illustrating the film forming and volume control means.

FIG. 5 is a view taken on line 5—5 of FIG. 3 with the film forming and volume control means removed, and with the insulation removed.

FIG. 6 is a vertical sectional view of a modified form of feed pipe and film forming and volume control means.

Figure 1:
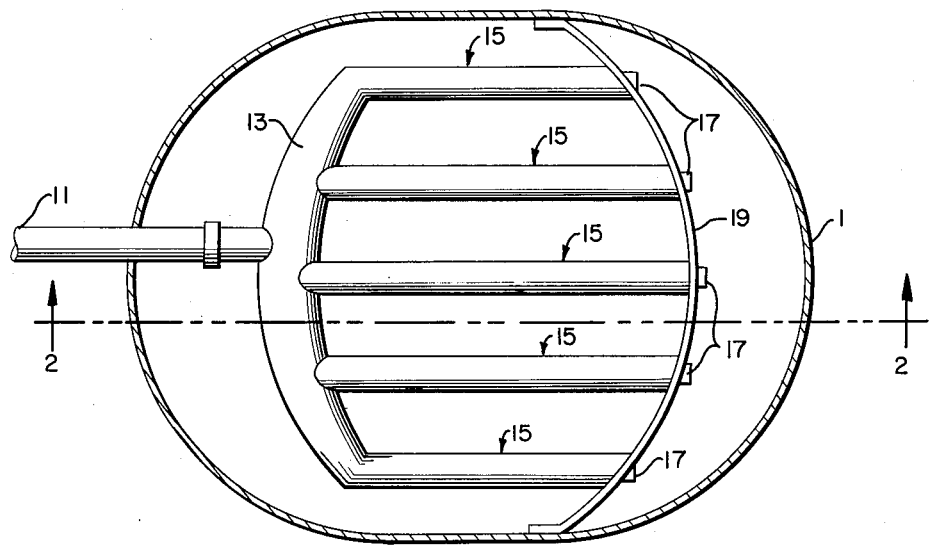
FIG. 1 is a top plan view of the pressure vessel with the cover thereof removed and illustrating the distribution system for the fluid material.

In the accompanying drawings I have used the numeral 1 to designate a pressure and heat treatment vessel having a cover 3 and a bottom 5. As will become apparent, the fluent material being treated is introduced into vessel 1 in a relatively thin film and is subjected within the vessel to a predetermined high heat and pressure which can be generated in any usual and suitable manner well known in the art. The cover 3 may be connected in sealed relation on the vessel in any suitable manner, as by hinges, clamps or the like so that access may be had to the interior of the vessel for cleaning, repair or replacement of parts. While I have illustrated the vessel as being of generally elliptical configuration, it will be understood that this is not necessary as it may be formed in various shapes. The bottom 5 may be formed with an outlet 7 therein for withdrawal of the treated fluent material 9 from the pressure and heat treatment vessel.

Figure 2:
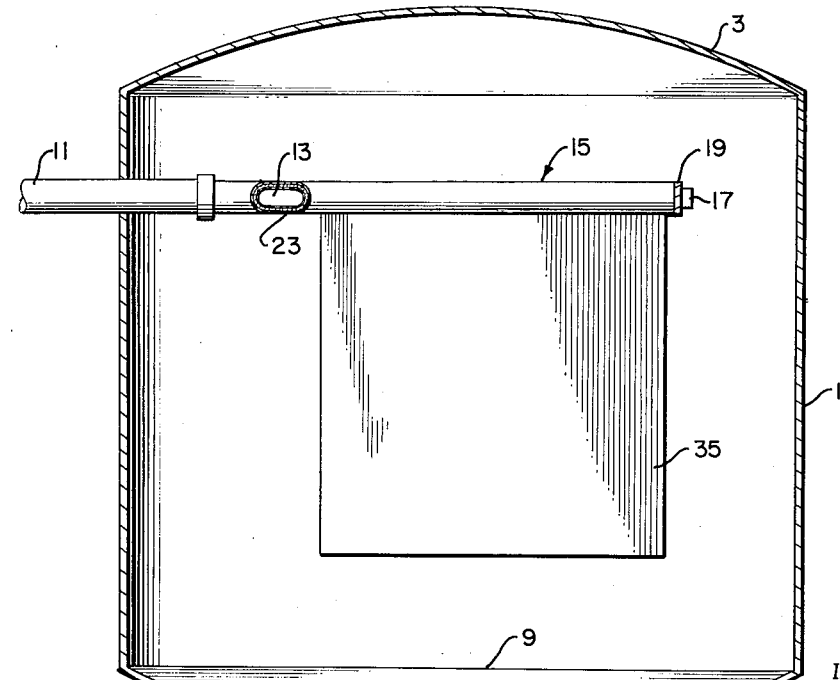
FIG. 2 is a view taken on line 2—2 of FIG. 1.
Figure 2:
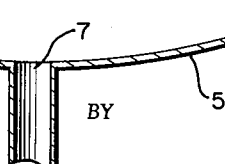

The distribution system by which the fluent material is conveyed to and fed into the vessel, under a pressure, which can be generated by any conventional pumping system, includes a supply pipe 11 which extends from a supply of material to be treated through a wall of vessel 1 and to and in communication with a header 13 which extends transversely of the vessel at a point substantially above the bottom thereof. I provide a plurality of feed pipes designated generally by numeral 15, each such feed pipe being connected to and in communication at one end to the header and extending forwardly therefrom within the vessel 1, as clearly illustrated in FIGS. 1 and 2 of the drawing. Each feed pipe 15 is closed at its opposite or forward end by means of a threaded nipple or like 17 whereby access may be had to the interiors of the feed pipes for cleaning. Any suitable bracket arrangement 19 may be provided for supporting the distribution system, including feed pipes 15, in proper position within the upper area of the pressurized heat vessel 1.

Each feed pipe 15 is provided at the lowermost point of its wall with a longitudinally extending slot 21 which, preferably though not necessarily, extends substantially the full length of the feed pipe, and may or may not constitute a continuous slot. While for purposes of illustration I have shown slot 21 of substantial width in actual practice, it is relatively narrow, and when the film forming device projects therethrough, as will be explained, there is merely a pair of hair line openings between the sides of the device and the adjacent walls of the slot.

Each feed pipe 15, the header 13, and at least that section of supply pipe 11 which is extended into pressurized heat vessel 1, is insulated by means of a shell of insulation 23 fixed thereabout. Any suitable type of known insulating medium may be used and the insulating shell may be affixed to the various elements of the distribution system in any usual manner which will not be affected by temperature changes, as for example by welding. The insulation which is applied to each feeder pipe 15 does not, of course, extend across feed slot 21, and the opposing edges of the insulating shell are preferably tapered or beveled as shown at 25 in FIG. 3. Since the insulated shell is joined or fixed to the feed pipe, the construction 25 will give rigidity and strength to the feed pipe, particularly at the slot, and will prevent distortion at the slot so that there will be even discharge of the fluent material through the slot.

I provide a longitudinally extending groove 27 on the interior wall of each feed pipe 15, the grooves being parallel and equally spaced from the slot. The purpose of these grooves will become apparent as this description proceeds.

The film forming and volume control device of my invention has been designated generally by the numeral 29 and comprises an elongated concave trough-like member 31 which is provided adjacent each longitudinal edge with a plurality of spaced threaded apertures 33 formed therethrough. A film guiding or supporting plate 35 is fixed to member 31 intermediate the longitudinal edges thereof and depends therefrom. It will be understood that plate 35 and member 31 may be integrally formed or one may be affixed to the other to provide an integral unit. I provide one unit 29 for each feed pipe 15 and each unit is of substantially the same length as the length of the slot 21 in the feeder pipe.

A film forming and volume control unit 29 is mounted in each feed pipe 15 with the plate 35 extending through the slot 21 and depending below the feed pipe. The member 31 which has a radius of curvature the same as the feed pipe is mounted within the pipe extending across the slot and spaced from the feed pipe by means of set screws 37 which are threaded through apertures 33 and extend into grooves 27. Since each groove is spaced the same distance from the slot, the plate 35 will be centered within the slot so that a film of material on one side of the plate will be of equal thickness to the thickness of the film on the other side thereof. While said grooves 27 are recognized as desirable, there will be instances in which none of these grooves will be required. In some instances the weight of the film forming and volume control unit 29 will cause the unit to center itself perfectly. In other instances the consistency of the materials being treated will be such that the units respond to pressures within the distribution system in a way which tends to equalize the film on both sides of the film forming surface without requiring use of the grooves. In that case the set screws 37 continue to perform the same function but by working against the inside surface of the distribution pipes rather than in the grooves.

With the distribution system assembled as described and shown, and with a unit 29 operatively mounted in each feed pipe and the heating and pressure generating means for vessel 1 in operation, the apparatus is in operative condition. Fluent material to be treated is fed into the distribution system under pressure through supply pipe 11 to header 13 and thence into feed pipes 15. The position of member 31 with respect to feed pipe 15 has been set by means of set screws 37, such position depending upon the consistency of the fluid material being treated and the desired volume of flow thereof through the slot. Now the fluent material within the feed pipe will be formed into a film therein and before it passes through the slot and into the pressure vessel, the film forming will occur between the member 31 and the pipe on each side of the slot 21 and plate 35, and each such preformed film will flow on each side of the plate and through the heat zone of the pressure vessel 1. Thus, the films will be formed within the feed pipe and before passing into the high heat zone of vessel 1. Thus, the films of fluent material which emerge from the feed pipe through the slot will be substantially uniform and will flow downwardly over plate 35 completely covering said plate and insulating it from the high heat being generated in the pressure vessel. It will be recognized that member 31 acts not only as a film forming member, but also as a valve controlling the volume of material which can flow through the slot, thereby preserving the pressure and temperature differential between the distribution system and the pressure vessel.

In FIG. 6 of the drawings I have illustrated a modified form of film forming device which may be used when the apparatus is employed primarily for treatment of a single fluent material where conditions will always be uniform. In describing this form of my invention I shall use the same reference numerals as heretofore used to describe similar parts.

The feed pipe 15 is insulated by shell 23 and is formed with slot 21 therein, the shell being formed with the tapered section 25 as in the preferred embodiment of the invention. The film forming device of FIG. 6 comprises a stainless steel or the like screen designated generally by the numeral 39. The screen includes a curved upper section 41 which is positioned within feed pipe 15 and a depending portion 43 which extends through slot 21 and into the pressure vessel. I provide clamp means designated generally by numeral 45 which is adapted to be applied to the feed pipe 15 and is operable to clamp the edges of the slot into engagement with the screen. The clamp may include clamping arms 47 engaging opposite sides of the feed pipe, a cross bar 49 extending between and through the upper ends of the arms and a wing nut 51 threaded on an extending portion of the cross bar for operation to cause clamping action by the clamping arms. Any suitable number of clamp means may be used on each feed pipe, and I do not intend to limit my invention to the use of the specific type of clamp means disclosed. It is to be recognized that when the slot is properly reinforced to maintain its rigidity even under heat stresses and the wire screen 39 is of a mesh which fills the slot completely enough to provide an adequate control over the volume of flow, no clamps may be required.

The screen cooperates with the walls of the feed pipe adjacent the slot to control the flow of fluent material through the slot. The fluent material flows down the screen through the interstices thereof and is subjected to the high temperatures present in the pressure vessel. The thickness of the screen, the mesh thereof, and the size of the slot will depend upon the characteristics of the fluent material being treated.

It will now be recognized that I have devised a process and apparatus which has solved the problems which prevent film forming devices known to the prior art from being satisfactory for temperature and volume control over fluent materials being subjected to very high heats.

I claim:

1. Apparatus for use in the high heat treatment of liquid which introduces the liquid to be treated into a pressure vessel in the form of a thin film, including a pressure vessel, and a distribution system for conveying the liquid to position for introduction into the pressure vessel, said distribution system being insulated from said pressure vessel to maintain a temperature differential between the distribution system and the pressure vessel, means mounted within the distribution system for forming the liquid into a thin film within said distribution system, and further means connected to and in communication with said means and extended exteriorly of said distribution system and into said pressure vessel for maintaining said liquid in the form of a thin film as it flows into and within said pressure vessel.

2. Apparatus for use in the high heat treatment of liquid which introduces the liquid to be treated into a pressure vessel in the form of a thin film, comprising a pressure vessel and a distribution system including a plurality of feed members for conveying the liquid to position for introduction into the pressure vessel, said distribution system being insulated from said pressure vessel, to maintain a temperature differential between the distribution system and the pressure vessel, means mounted within said members and coactive therewith and operative to form a thin film of the liquid within said members and to control the volume of flow of the liquid from the members into the pressure vessel, and further means connected to and in communication with said means and extended into said pressure vessel for maintaining the liquid in the form of a thin film as it flows into and within said pressure vessel.

3. Apparatus in accordance with claim 2, wherein each of said members is provided with a feed opening for flow of liquid therethrough and into the pressure vessel, and said means is mounted in each member in position therein extending across and between the opening and the interior of the member and in spaced relation to the opening.

4. Apparatus in accordance with claim 2, wherein each of said members is provided with a feed opening for flow of liquid therethrough and into the pressure vessel, and said means is mounted in each member in position therein extending across and between the opening and the interior of the member and in spaced relation to the opening, and mounting means is provided for said means and said further means including mechanism coactive with the member for regulating the spacing of the means relative to the opening and positioning the further means relative to the opening.

5. Apparatus for use in the high heat treatment of liquid which introduces the liquid to be treated into a pressure vessel in the form of a thin film, comprising a pressure vessel and a distribution system for receiving liquid from a supply thereof, said distribution system including a feed pipe and said distribution system being insulated from said pressure vessel, said feed pipe being provided with a longitudinally extending slot therein, an elongated imperforate dished plate mounted in said pipe and extending across said slot and beyond each side thereof and in spaced relation thereto, whereby a thin film of liquid will form between the feed pipe and the plate, and a flat plate fixed to said dished plate and depending therefrom through said slot and into the pressure vessel for flow of said film of liquid thereover.

6. Apparatus in accordance with claim 5, wherein means is provided in said feed pipe and on said dished plate for centering said flat plate within the slot and for regulating the spacing of said dished plate relative to the slot.

7. Apparatus for introducing liquid into a pressurized heat treatment vessel in the form of a thin film, comprising a pressurized heat treatment vessel and a distribution system including a plurality of insulated members mounted within the vessel and having feed openings therein for flow of liquid therefrom and into the vessel, there being a pressure differential between the distribution system and the vessel, valve means mounted within the feed members and coactive therewith for controlling the volume of flow of liquid through the feed opening and for forming a thin film of liquid within the feed members, and said valve means being positioned relative to the feed openings to maintain the pressure differential between the distribution system and the vessel, and means connected to and in communication with said valve means and extended into said vessel for receiving the thin film of liquid as it flows through said feed openings and maintaining it in the form of a thin film within the vessel.

8. Apparatus for use in the high heat treatment of liquid which introduces the liquid to be treated into a pressure vessel in the form of a thin film, comprising a pressure vessel and a feed pipe for receiving the liquid from a supply thereof, said feed pipe being provided with a longitudinally extending slot therein, and means extending through said slot and into the pressure vessel for forming the liquid into a thin film, and said means comprising a reticulated element.

9. Apparatus in accordance with claim 8, wherein the edges of said slot are in engagement with said reticulated element.

10. Apparatus in accordance with claim 8, wherein the edges of said slot are in engagement with said reticulated element and clamping means is provided on said feed pipe which is operable to press the edges against the reticulated element.

11. A process for the heat treatment of liquid in a pressurized heat treatment vessel comprising the steps of forming the liquid into a thin film in a distribution system prior to introduction into a pressurized heat treatment vessel, introducing said thin film of liquid into the pressurized heat treatment vessel and maintaining said liquid in the form of a thin film of substantially uniform thickness within the pressurized heat treatment vessel and while being subjected to the heat treatment therein.

12. A process for the heat treatment of liquid in a pressurized heat treatment vessel comprising the steps of preheating the liquid to a temperature of approximately 150° F. prior to being introduced into the pressurized heat treatment vessel, and while in a distribution system, forming the liquid into a thin film prior to introduction into the pressurized heat treatment vessel, introducing said thin film of liquid into the pressurized heat treatment vessel and maintaining said liquid in the form of a thin film within the pressurized heat treatment vessel and subjecting it to a temperature of approximately 300° F. and maintaining the temperature differential between the distribution system and the pressurized heat treatment vessel.

13. A process for the heat treatment of liquid in a pressurized heat treatment vessel comprising the steps of forming the liquid into a thin film in a distribution system prior to introduction into a pressurized heat treatment vessel, controlling the flow of said thin film of liquid from the distribution system into the pressurized heat treatment vessel, maintaining said liquid in the form of a thin film of substantially uniform thickness within the pressurized heat treatment vessel and while being subjected to the heat treatment therein.

References Cited in the file of this patent

UNITED STATES PATENTS

| | | |
|---|---|---|
| 2,238,924 | Bennett | Apr. 22, 1941 |
| 2,358,320 | Mulley | Sept. 26, 1944 |
| 2,899,320 | Davies et al. | Aug. 11, 1959 |